US006747179B1

(12) United States Patent
DeSimone et al.

(10) Patent No.: US 6,747,179 B1
(45) Date of Patent: Jun. 8, 2004

(54) CARBON DIOXIDE-SOLUBLE POLYMERS AND SWELLABLE POLYMERS FOR CARBON DIOXIDE APPLICATIONS

(75) Inventors: Joseph M. DeSimone, Chapel Hill, NC (US); Eva Birnbaum, Los Alamos, NM (US); Ruben G. Carbonell, Raleigh, NC (US); Stephanie Crette, Chapel Hill, NC (US); James B. McClain, Durham, NC (US); T. Mark McCleskey, Los Alamos, NM (US); Kimberly R. Powell, Chapel Hill, NC (US); Timothy J. Romack, Durham, NC (US); William Tumas, Los Alamos, NM (US)

(73) Assignees: North Carolina State University, Raleigh, NC (US); The University of North Carolina at Chapel Hill, Chapel Hill, NC (US); Regents of University of California, Oakland, CA (US)

( * ) Notice: Subject to any disclaimer, the term of this patent is extended or adjusted under 35 U.S.C. 154(b) by 0 days.

(21) Appl. No.: 09/641,815

(22) Filed: Aug. 18, 2000

Related U.S. Application Data

(60) Provisional application No. 60/150,015, filed on Aug. 20, 1999, and provisional application No. 60/150,039, filed on Aug. 20, 1999.

(51) Int. Cl.[7] ............................ C07C 5/02; C07C 45/00; C07D 303/00
(52) U.S. Cl. ................. 585/250; 585/502; 585/520; 568/451; 568/454; 549/512; 549/513
(58) Field of Search ................................ 585/250, 502, 585/520, 500; 568/451, 454; 549/512, 513

(56) References Cited

U.S. PATENT DOCUMENTS

| | | | |
|---|---|---|---|
| 5,242,877 A | 9/1993 | Dobson et al. | 502/159 |
| 5,274,129 A | 12/1993 | Natale et al. | 549/349 |
| 5,356,538 A | 10/1994 | Wai et al. | 210/634 |
| 5,451,633 A | 9/1995 | DeSimone et al. | 524/731 |
| 5,463,082 A | 10/1995 | Horvath et al. | 549/46 |
| 5,589,105 A | 12/1996 | DeSimone et al. | 252/351 |
| 5,606,724 A | 2/1997 | Wai et al. | 423/3 |
| 5,639,836 A | 6/1997 | DeSimone et al. | 526/201 |
| 5,641,887 A | 6/1997 | Beckman et al. | 546/26.2 |
| 5,676,705 A | 10/1997 | Jureller et al. | 8/142 |
| 5,679,737 A | 10/1997 | DeSimone et al. | 524/529 |
| 5,683,977 A | 11/1997 | Jureller et al. | 510/286 |
| 5,730,874 A | 3/1998 | Wai et al. | 210/638 |
| 5,734,070 A | 3/1998 | Tacke et al. | 554/144 |
| 5,739,223 A | 4/1998 | DeSimone | 526/89 |
| 5,763,662 A | 6/1998 | Ikariya et al. | 564/132 |
| 5,783,082 A | 7/1998 | DeSimone et al. | 210/634 |
| 5,837,158 A | * 11/1998 | Shepodd et al. | 252/181.6 |
| 5,869,739 A | 2/1999 | Ikariya et al. | 560/231 |
| 6,211,422 B1 | * 4/2001 | DeSimone et al. | 585/16 |
| 6,255,367 B1 | * 7/2001 | Bitler et al. | 523/522 |
| 6,316,646 B1 | * 11/2001 | Tacke et al. | 554/144 |

FOREIGN PATENT DOCUMENTS

| | | | |
|---|---|---|---|
| DE | 19702025 A1 | 7/1998 | C07C/45/50 |
| DE | 19720798 A1 | 10/1998 | C07B/37/10 |
| EP | 0373683 A1 | 11/1989 | 301/32 |

OTHER PUBLICATIONS

U.S. patent application Ser. No. 09/185,891, DeSimone et al., filed Nov. 4, 1998.
Baiker; "Supercritical Fluids in Heterogeneous Catalysis," *Chem. Rev.* 99:453–473 (1999), no month.
Bailey et al.; "Immobilized TransitionMetal Carbonyls and Related Catalysts," *Chemical Reviews* 81:2 109–148 (Apr. 1981).
Baker et al.; "Toward Greener Chemistry," *Science* 284:1477–1479 (May 28, 1999).
Clark et al.; "Extended Alkylate Production Activity during Fixed–Bed Supercritical 1–Butene/Isobutane Alkylation on Solid Acid Catalysts Using Carbon Dioxide as a Diluent," *Ind. Eng. Chem. Res.* 37:1243–1250 (1998), no month.
Dordick et al.; "Chemical and biochemical catalysis to make swellable polymers," *Chemtech* 33–39 (Jan. 1994).
Dordick et al.; "Biocatalytic plastics," *Chemistry & Industry* 17–20 (Jan. 5, 1998).
Dumont et al.; "Asymmetric Catalytic Reduction with Transition Metal Complexes. II. Asymmetric Catalysis by a Supported Chiral Rhodium Complex[1]," *Journal of the American Chemical Society* 95:25 8295–8299 (Dec. 12, 1973).
Fürstner et al.; "Olefin Metathesis in Compressed Carbon Dioxide," *Angew. Chem. Int. Ed. Engl.* 36:22 2466–2469 (1997), no month.
Guillevic et al.; "Synthesis, Structure, and Oxidative Additions of a Fluorous Analogue of Vaska's Complex, trans–[IrCl(CO){P[Ch$_2$CH$_2$(CF$_2$)$_5$CF$_3$]$_3$}$_2$]—Altered Reactivity in Fluorocarbons and Implications for Catalysis," *Angew. Chem. Int. Ed. Engl.* 36:15 1612–1630 (1997), no month.
Hitzler et al.; "Continuous hydrogenation of organic compounds in supercritical fluids," *Chem. Commun.* 1667–1668 (1997), no month.
Hori et al.; "Rhodium–Catalyzed Phenylacetylene Polymerization in Compressed Carbon Dioxide," *Macromolecules* 32:3178–3182 (1999), no month.

(List continued on next page.)

*Primary Examiner*—Walter D. Griffin
(74) *Attorney, Agent, or Firm*—Myers Bigel Sibley & Sajovec PA (57) ABSTRACT

A method for carrying out a catalysis reaction in carbon dioxide comprising contacting a fluid mixture with a catalyst bound to a polymer, the fluid mixture comprising at least one reactant and carbon dioxide, wherein the reactant interacts with the catalyst to form a reaction product. A composition of matter comprises carbon dioxide and a polymer and a reactant present in the carbon dioxide. The polymer has bound thereto a catalyst at a plurality of chains along the length of the polymer, and wherein the reactant interacts with the catalyst to form a reaction product.

16 Claims, 5 Drawing Sheets

OTHER PUBLICATIONS

Horvath et al.; "Facile Catalyst Separation Without Water: Fluorous Biphase Hydroformylation of Olefins," *Science* 266:72–75 (Oct. 7, 1994).

Horvath et al.; "Molecular Engineering in Homogeneous Catalysis: One–Phase Catalysis Coupled with Biphase Catalyst Separation. The Fluorous–Soluble HRh(CO){P[CH$_2$CH$_2$(CF$_2$)$_5$CF$_3$]$_3$}$_3$ Hydroformylation System," *J. Am. Chem. Soc.* 120:3133–3143 (1998), no month.

Jessop et al.; "Homogeneous Catalysis in Supercritical Fluids: Hydrogenation of Supercritical Carbon Dioxide to Formic Acid, Alkyl Formates, and Formamides," *J. Am. Chem. Soc.* 118:344–355 (1996), no month.

Jessop et al.; "Homogeneous Catalysis in Supercritical Fluids," *Chem. Rev.* 99:475–493 (1999), no month.

Kainz et al.; "Catalytic asymmetric hydroformylation in the presence of compressed carbon dioxide," *Catalysis Letters* 55:223–225 (1998), no month.

Koch et al.; "Rhodium–Catalyzed Hydroformylation in Supercritical Carbon Dioxide," *J. Am. Chem. Soc.* 120:13398–13404 (1998), no month.

McGrath et al.; "Functionalization of Polymers by Metal–Mediated Processes," *Chem. Rev.* 95:381–398 (1995), no month.

Morgenstern et al.; "Supercritical Carbon Dioxide as a Substitute Solvent for Chemical Synthesis and Catalysis," Chapter 11, *Green Chemistry, Designing Chemistry for the Environment, ACS Symp. Series 626*, pp. 132–151 (1996), no month.

Morita et al.; "Palladium–catalyzed cross–coupling reactions in supercritical carbon dioxide," *Chem. Commun.* 1397–1398 (1998), no month.

Palo et al.; "Homogeneous Catalytic Hydroformylation of 1–Octene in Supercritical Carbon Dioxide Using a Novel Rhodium Catalyst with Fluorinated Arylphosphine Ligands," *Ind. Eng. Chem. Res.* 37:4203–4206 (1998). No month.

Peltonen et al.; "Poly[propylene–graft–(4–vinylpyridinium dichromate)]: A Novel Fibrous Polymer–Supported Oxidizing Agent," *Ind. Eng. Chem. Res.* 33:235–238 (1994), no month.

Pesiri et al.; "Selective epoxidation in dense phase carbon dioxide," *Chem. Commun.* 1015–1016 (1998), no month.

Pozzi et al.; "Efficient aerobic epoxidation of alkenes in perfluorinated solvents catalysed by chiral (salen) Mn complexes," *Chem. Commun.* 877–878 (1998), no month.

Sarbu et al.; "Non–fluorous polymers with very high solubility in supercritical CO$_2$ down to low pressures," *Nature* 405:165–168 (May 11, 2000).

Stradi et al.; "Phase behavior of the reactants, products and catalysts involved in the allylic epoxidation of trans–2–Hexen–1–ol to (2R,3R)–(+)–3–Propyloxiranemethanol in high pressure carbon dioxide," *Journal of Supercritical Fluids* 12:109–122 (1998), no month.

Takaishi et al.; "Transition Metal Catalyzed Asymmetric Organic Syntheses via Polymer Bound Chiral Ligands, Synthesis of R Amino Acids and Hydratropic Acid by Hydrogenation," *Journal of the American Chemical Society* 98:17 5400–5402 (Aug. 18, 1976).

Takaishi et al.; "Transition Metal Catalyzed Asymmetric Organic Syntheses via Polymer–Attached Optically Active Phosphine Ligands. Synthesis of R Amino Acids and Hydratropic Acid by Hydrogenation[1]," *Journal of the American Chemical Society* 100:1 264–268 (Jan. 4, 1978).

Thomas; "Turning Point in Catalysis," *Angew. Chem. Int. Ed. Engl.* 33:913–937 (1994), no month.

* cited by examiner

CARBON DIOXIDE-SOLUBLE POLYMERS AND SWELLABLE POLYMERS FOR CARBON DIOXIDE APPLICATIONS

CROSS-REFERENCE TO RELATED APPLICATIONS

The application claims priority to U.S. Provisional Applications No. 60/150,015 filed Aug. 20, 1999 and Ser. No. 60/150,039 filed Aug. 20, 1999, the disclosures of which are incorporated herein by reference in their entirety.

STATEMENT REGARDING FEDERAL RIGHTS

The present invention was made with Government support under Contract No. W-7405-ENG-36 from the U.S. Department of Energy. The Government has certain rights to this invention.

FIELD OF THE INVENTION

This invention generally relates to compositions containing polymers useful in carbon dioxide processes.

BACKGROUND OF THE INVENTION

Separation and catalytic reaction processes play an extremely significant role in the chemical and materials process industry. With respect to catalysis, there is currently a high level of interest directed toward catalyst systems with improved selectivity, activity, and recovery for the synthesis of a wide range of chemicals. Of particular interest are specialty chemicals particularly chiral compounds which are believed to be important to the agrochemical and pharmaceutical industries.

Catalysis processes involving complex chelating (often chiral) bisphosphine and aminophosphine ligands with precious metals such as rhodium, platinum, and palladium has received a high level of attention. The industrial application of such catalysts, however, is believed to be severely hampered in that one is often unable to recover and reuse these materials. This is highly significant in that the inability to recycle and reuse the catalysts result in processes that are often too costly to implement. Moreover, heightened environmental scrutiny provides additional motivation to recover the catalysts.

Heterogeneous catalysis potentially offers a partial solution to the above difficulties, and is widely employed in chemical commodity synthesis. Although these catalysts offer the advantage of separability, they generally do not allow for controlled design and synthesis of the immediate ligand environment. Such controlled design and synthesis is typically important for controlling catalyst selectivity and activity. In an attempt to address the above problem, the heterogenization of homogeneous catalysis has been proposed which typically involves employing polymeric or inorganic supports. See, e.g., J. M. Tomas et al., *Angew. Chem. Int.* (1994), 33, p. 913, (1994); R. D. Srivastava, *Heterogeneous Catalytic Science*, CRC Press, Boca Raton, Fla., (1988); D. C. Bailey et al., *Chem. Rev.* (1981) 81, p. 109; R. T. Peltonen, et al., Ind. Eng. Chem. Res. (1994), 33, p. 235; and M. G. McGrath et al., Chem. Rev. (1995) 95, p.381. In general, these efforts are carried out in an attempt to combine the advantages of homogeneous catalysis (e.g., ability to control selectivity and activity through designed ligands, controllable ligand environment, and firm mechanistic understanding) and heterogeneous catalysts (e.g., ease of separation). Various catalysts heterogenized with inorganic and organic supports have been developed. However, they have often been plagued by mass transfer problems. Low selectivity has also been observed in these systems.

Conventional separation processes typically involve aqueous and organic media, and as a consequence waste products comprising these materials are often generated.

In view of the above, there is a need in the art for chemical processes that could take place in a potentially more environmentally favorable medium.

SUMMARY OF THE INVENTION

In one aspect, the invention provides a method for carrying out a catalytic reaction in carbon dioxide. The invention comprises contacting a mixture with a catalyst bound to a polymer wherein the reactant interacts with the catalyst to form a reaction product. The fluid mixture comprises at least one reactant and carbon dioxide.

The polymer that is employed in accordance with the invention may be either soluble or insoluble in the carbon dioxide. Such polymers preferably comprise at least one "carbon dioxide soluble" ("carbon dioxidephilic") segment that has an affinity for carbon dioxide. Polymers that are insoluble in carbon dioxide are typically crosslinked. In various embodiments, these polymers may be considered "swellable" in the carbon dioxide as defined in greater detail herein, although other types of polymers may be employed.

In another aspect, the invention provides a composition of matter comprising carbon dioxide and a polymer present in the carbon dioxide. The polymer has bound thereto a catalyst at a plurality of chains along the length of the polymer.

In another aspect, the invention provides a method of separating at least one component from a fluid mixture. The method comprises contacting a polymer with a fluid mixture comprising at least one component and carbon dioxide. The carbon dioxide interacts with the polymer and separates from the fluid mixture such that the fluid mixture has an increased concentration of the at least one component.

These and other aspects are provided by the present invention.

BRIEF DESCRIPTION OF THE DRAWINGS

FIGS. 5A and 5B illustrate polymers each comprising 5 weight percent styrene, 80 weight percent ethylene glycol dimethacrylate, and 15 weight percent FOMA. Each polymer has a porosity of 230 $m^2/g$ measured by $N_2$-BET.

DETAILED DESCRIPTION OF PREFERRED EMBODIMENTS

The invention will now be described with reference to its more preferred embodiments. It should be understood, however, that these embodiments are for illustrative purposes only, and do not serve to limit that scope of the invention.

In one aspect, the invention provides a method for carrying out a catalytic reaction in carbon dioxide. The invention comprises contacting a mixture with a catalyst bound to a polymer wherein the reactant interacts with the catalyst to form a reaction product. The fluid mixture comprises at least one reactant and carbon dioxide. In another aspect, the invention provides a composition of matter. The composition comprises carbon dioxide and a polymer in the carbon dioxide. The polymer has bound thereto a catalyst at a plurality of locations along the chain of the polymer.

Carbon dioxide used to carry out the present invention may be in a gas, liquid, or supercritical state. Carbon dioxide is employed as a solvent. Liquid and supercritical carbon dioxide are preferred. If liquid $CO_2$ is used, the temperature employed during the process is preferably below 31° C. If gaseous $CO_2$ is used, it is preferred that the phase be employed at high pressure, preferably above atmospheric and below the vapor pressure of $CO_2$. The term "high pressure" generally refers to $CO_2$ having a pressure from about 150 psia to about 50,000 psia. In one embodiment, the $CO_2$ is utilized in a "supercritical" phase. As used herein, "supercritical" means that a fluid medium is above its critical temperature and pressure, i.e., about 31° C. and about 71 bar. The thermodynamic properties of $CO_2$ are reported in Hyatt, *J. Org. Chem.* 49: 5097–5101 (1984); therein, it is stated that the critical temperature of $CO_2$ is about 31° C.; thus the method of the present invention may be carried out at a temperature above 31° C. For the purposes of the invention, it is preferred to employ $CO_2$ at a pressure ranging from at a lower end of about 150 psia to an upper end of about 50,000 psia. It is preferred that carbon dioxide be employed as a continuous phase. In a preferred embodiment, the fluid mixture comprises from about 50 to about 99 percent by weight of carbon dioxide, and more preferably from about 75 or 80 to about 99 percent by weight.

In addition, other materials that are a gas at standard temperature and pressure (STP) and can be transformed to a liquid or a supercritical fluid under increased (i.e., superatmospheric) pressure can be used instead of the carbon dioxide in the methods of the invention, particularly as solvents. The fluid preferably is one that is not potentially harmful to the atmosphere and is non-toxic towards humans, animals, and plants when vented or released. Other such fluids include hydrofluorocarbons (HFCs) and perfluorocarbons (e.g., perfluoropropane and perfluorocyclobutane) that are gasses at STP, hydrocarbons that are gases at STP, polyatomic gases, noble gases, and mixtures thereof. Other fluorosolvents may be used. Useful polyatomic gases include $SF_6$, $NH_3$, $N_2O$, and CO. Preferred reaction fluids include HFCs, perfluorocarbons, and mixtures thereof. Examples of useful HFCs include those that are known to be good solvents for many small organic compounds, especially those HFCs that comprise from 1 to 5 carbon atoms. Specific examples include 1,1,2,2-tetrafluoroethane, 1,1,1, 2-tetrafluoroethane, trifluoromethane, and 1,1,1,2,3,3,3-heptafluoropropane. Compatible mixtures of any two or more of the foregoing also can be used as the fluid. It is preferred that the fluid mixture comprise from about 50 to about 99 percent by weight of any of the above components, and more preferably from about 75 or 80 to about 99 percent by weight of any of the above components.

A cosolvent may be added to the reaction mixture if desired. Cosolvents that may be used in carrying out the present invention are typically organic cosolvents such as methanol, ethanol, ethyl acetate, tetrahydrofuran, alcohols, liquid alkanes, methylene chloride, chloroform, toluene, water, ketones, and esters. Fluorosolvents, particularly those which are not gases may also be used. If used, the cosolvent may be employed in various amounts, preferably from above 0 to about 50 percent based on the weight of the composition.

In one embodiment, carbon dioxide soluble polymers may be aemployed. "Soluble" as used herein with respect to the solubility of the polymers in the carbon dioxide (with or without the cosolvent) is specifically intended to include both fully soluble and partially soluble polymers, as long as some of the polymer is solubilized in the carbon dioxide. The polymer iray be soluble in the carbon dioxide (and in some embodiments is preferably soluble in the carbon dioxide). In other instances, the polymer may be insoluble in carbon dioxide, but may be swellable in the. carbon dioxide. For the purposes of the invention, the term "swellable" refers to the carbon dioxide being able to penetrate or plasticize the polymer. In this instance, the polymer may be present in the form of a crosslinked network (chemically and physically), preferably as beads, a film, or both. Beads may vary in size. In one embodiment, the beads may vary from about 40 $\mu$m to about 450 $\mu$m. Carbon dioxide insoluble polymers that may not be considered swellable can be crosslinked.

In various embodiments, polymers that may be used to carry out the present invention are preferably polymers that contain a $CO_2$-philic group, and which polymers are soluble in carbon dioxide. These materials are described in U.S. Pat. Nos. 5,783,082; 5,589,105; 5,639,836; and 5,451,633 to DeSimone et al.; 5,676,705; and 5,683,977 to Jureller et al., the disclosures of which are incorporated herein by reference in their entirety. Examples of $CO_2$-philic groups include silicone-containing groups or polysiloxanes, halogen (particularly fluorine) containing groups or halo (particularly fluoro)carbons, and branched polyalkylene oxides and fluorinated polyethers. If employed, the fluorine-containing segment is typically a "fluoropolymee". As used herein, a "fluoropolymer" has its conventional meaning in the art and should also be understood to include low molecular weight oligomers, i.e., those which have a degree of polymerization greater than or equal to two. See generally Banks et al., *Organofluorine Compounds: Principals and Applications* (1994); see also *Fluorine-Containing Polymers*, 7 Encyclopedia of Polymer Science and Engineering 256 (H. Mark et al. Eds. 2d Ed. 1985). Exemplary fluoropolymers are formed from monomers which may include fluoroacrylate monomers such as 2-(N-ethylperfluorooctane-sulfonamido) ethyl acrylate ("EtFOSEA"), 2-(N-ethylperfluorooctane-sulfonamido) ethyl methacrylate ("EtFOSEMA"), 2-(N-methylperfluorooctane-sulfonamido) ethyl acrylate ("MeFOSEA"), 2-(N-methylperfluorooctane-sulfonamido) ethyl methacrylate ("MeFOSEMA",), 1,1'-dihydroperfluorooctyl acrylate ("FOA"), 1,1'-dihydroperfluorooctyl methacrylate ("FOMA"), 1,1',2,2'- tetrahydroperfluoroalkylacrylate, 1,1',2,2'-tetrahydroperfluoroalkyl-methacrylate and other fluoromethacrylates; fluorostyrene monomers such as α-fluorostyrene and 2,4,6-trifluoromethylstyrene; fluoroalkylene oxide monomers such as hexafluoropropylene oxide and perfluorocyclohexane oxide; fluoroolefins such as tetrafluoroethylene, vinylidine fluoride, and chlorotrifluoroethylene; and fluorinated alkyl vinyl ether monomers such as perfluoro(propyl vinyl ether) and perfluoro(methyl vinyl ether). Copolymers using the above monomers may also be employed. Exemplary siloxane-containing segments include alkyl, fluoroalkyl, and chloroalkyl siloxanes. More specifically, dimethyl siloxanes and polydimethylsiloxane materials are useful. Mixtures of any of the above may be used.

The polymers may consist entirely of the $CO_2$-philic group, or may be a copolymer of a $CO_2$-philic group and a group that is not otherwise soluble in $CO_2$ ("$CO_2$-phobic"). In a preferred embodiment, the $CO_2$-philic group and the $CO_2$-phobic are covalently bonded. Thus the term "polymer" as used herein includes "copolymer". Copolymers may be of any type, including random copolymers, block copolymers, graft copolymers, etc. The polymer may be linear or branched. Such polymers are known. See, e.g., U.S. Pat. No. 5,739,223 to DeSimone (Method of Making Fluoropolymers), the disclosure of which is incorporated herein by reference in its entirety; see also U.S. Pat. No. 5,676,705 to Jureller et al. Fluoropolymers, particularly fluoroacrylates, are preferred (including the copolymers thereof), the disclosures of which are incorporated herein by reference. Fluoroacrylates include those acrylates that are either fully or partially fluorinated.

In a preferred embodiment of the invention, the $CO_2$-philic backbone is primarily comprised of a fluoropolymer such as those derived from fluorinated acrylate or methacrylate monomers (R=H, $CH_3$; n=1, 2; m=1–10) See formula (I). Other suitable $CO_2$-soluble materials for the composition of the polymeric backbone include fluorinated ethers, silicones, and phosphazenes.

(I)

Synthesis of the polymer can be carried out by random copolymerization of a suitable monomer for the $CO_2$-philic backbone with a comonomer bearing a functional group. In a preferred embodiment, the comonomer may be capable of serving as a ligand or a point of attachment for a ligand. For example, a random copolymer composed of telomer acrylate-n Zonyl® TAN by DuPont (a fluorinated acrylate monomer) and 2-(methacryloyloxy)ethyl acetoacetate (a ligand bearing monomer) can be synthesized via free radical solution polymerization initiated by 2,2'-azobisisobutyronitrile (AIBN) in α, α, α-trifluorotoluene (TFT) at 60° C. If employed the amount of functionalized comonomer incorporated can be varied. Preferably, the cdmonbmer is present in the range of about 1 to about 40 mol percent based on the weight of the composition, and more preferably from about 5 to about 25 mol percent.

As an example, a copolymer may be present as a linear random copolymer although alternating, block, graft or crosslinked copolymers of appropriate composition may be suitable. The copolymers may be prepared by any of a number of suitable processes such as bulk, suspension, or emulsion polymerization although in a preferred embodiment of the present invention thecopolymers are prepared by solution polymerization. Most preferably, the polymerization solvent is either carbon dioxide or a fluorous solvent such as TFT. Typical free radical initiators used for the polymerization are those capable of catalyzing the polymerization at temperatures in the range of 50° C. to 70° C. such as AIBN, lauroyl peroxide, benzoyl peroxide, and the like. The amount of initiator can be varied but is normally from about 0.1 to about 2 mol percent, more preferably 1 mol percent.

In general, the polymer is included in the composition in an amount of from about 1 or 2 percent to about 30 or 40 percent by weight. When included, the cosolvent is included in the composition in an amount of from about 0.1 or 1 percent to about 40 or 50 percent by weight.

Suitable $CO_2$-phobic groups are known and include, without limitation, in accordance with the invention, the "$CO_2$-phobic" segment has an affinity for the polymer material. Exemplary $CO_2$-phobic segments may comprise common lipophilic, oleophilic, and aromatic polymers, as well as oligomers formed from monomers such as ethylene, α-olefins, styrenics, acrylates, methacrylates, ethylene oxides, isobutylene, vinyl alcohols, acrylic acid, methacrylic acid, and vinyl pyrrolidone. The $CO_2$-phobic segment may also comprise molecular units containing various functional groups such as amides; esters; sulfones; sulfonamides; imides; thiols; alcohols; dienes; diols; acids such as carboxylic, sulfonic, and phosphoric; salts of various acids; ethers; ketones; cyanos; amines; quaternary ammonium salts; and thiozoles. Mixtures of any of these components can make up the "$CO_2$-phobic segment".

The swellable polymers that are insoluble in carbon dioxide may encompass a wide range of materials and may be formed from a number of suitable monomers. Examples of monomers include any of the $CO_2$-phobic segments set forth herein such as, for example, styrenics, α-olefins, ethylene oxides, dienes, amides, esters, sulfones, sulfonamides, imides, thiols, alcohols, diols, acids, ethers, ketones, cyanos, amines, quaternary ammonium salts, acrylates, methacrylates, thiozoles, and mixtures thereof. These monomers may be copolymerized with other monomers set forth herein to form a crosslinked polymer that is swellable in carbon dioxide.

Any number of suitable crosslinkers can be used in forming the swellable polymers of the invention, the selection of which are known to one skilled in the art. Exemplary crosslinkers include those which may be come incorporated into the swellable polymer such as, without limitation, divinylbenzene, ethylene glycol diacrylate, 1,4-cyclohexylene-bis(oxyethyl) dimethacrylate, 1,4-cyclohexylene-bis(oxypropyl) dimethacrylate, 1,4-cyclohexylene-bis(oxypropyl) diacrylate, ethylene glycol dimethacrylate, and mixtures thereof. Although not intending to be bound by theory, in one embodiment, the crosslinking agent serves to crosslink a $CO_2$-phobic segment to a $CO_2$-philic segment. The crosslinking agent may therefore be incorporated into the polymer.

A wide number of catalysts may be used and are known by those who are skilled in the art. Suitable catalysts include but are not limited to those metal catalysts that are typically employed in epoxidation, hydrogenation, hydroformylation, hydrocarboxylation, and oxidative carbon-carbon single bond formation reactions. Examples of metals employed as catalysts include, but are not limited to, transition metal catalysts including such as Group IIIA, IVA, VA, VIA, VIIA, VIIIA, IB, IIB, IIIB, IVB, VB, VIB, and VIIB metals. Exemplary metals include, but are not limited to, ruthenium, rhodium, palladium, platinum, vanadium, and molybdenum. Fluorous-soluble materials such as those described in Horvath, I.T. et al., *J. Am. Chem. Soc.*, 1998 120 3133–3143, may also be used such as, for example, HRh(CO){P[CH$_2$CH$_2$(CF$_2$)$_5$CF$_3$]$_3$}$_3$.

Enzymatic catalysts can also be used if so desirable. For the purposes of the invention, the term "enzymatic catalyst" encompasses enzymes that serve as catalysts in carbon dioxide and that may be attached to the polymers. Examples of these materials include, but are not limited to, alcohol dehydrogenases, alcohol oxidase, aldolase, phosphatases, alpha-chymotrypsin, asparaginase, anhydrase, catalase, creatine kinase, glutaminase, oxidases, lipases, luciferase, urease, hydratase, peroxidase, subtilisin Carlsberg and BPN', thermolysin, superoxidase, nitrileamidase, esterases, transaminase, trypsin, fumarase, amidase, acylase, peptidases, carboxylases, RNAses, glycolases, transferases, and the like. Combinations of the above may be used. Other enzymes include, but are not limited to, enzymes derived from conventional microbial, plant, animal sources, or also from extremophiles.

The enzymatic catalysis reaction may be carried out under conditions known to one skilled in the art, and using known equipment. Preferably, a reaction is carried out at a temperature of a low end of about −50° C., −20° C., or 0° to a high end of about 100° C., 200° C. or 350° C.

The enzymatic catalyst may be used with any of polymers set forth herein. As an example, an embodiment for incorporating an enzyme into a swellable polymer is as follows. An enzyme that it typically water-soluble is made soluble in organic media. Therefore, as a first step, the enzyme is treated in such a way that it becomes hydrophobic. Thus, the enzyme may be incorporated into a dispersed phase which is employed in an aqueous suspension polymerization. The dispersed phase also comprises monomers and initiator.

In reference to above, the enzyme may be made more hydrophobic by dissolving the enzyme in an aqueous solution mixed with an organic phase containing a surfactant. The surfactant forms an ion-pair with the enzyme allowing it to become more hydrophobic and partition into an organic phase.

The enzyme may incorporated into the polymer matrix in various ways, with two embodiments being described below. In one example, the enzyme is chemically modified to provide polymerizable moieties (e.g., acrylamide) which will react with the monomers in the dispersed phase. In another example, the enzyme will react with an enzyme attachment site already present in the swellable polymer matrix.

Preferably, the catalyst used in the invention is employed in an amount ranging from above 0 to about 40 mol percent based on the polymer.

In a preferred embodiment, the catalyst (particularly the catalyst containing a transition metal) is bound to a ligand that is bound to the polymer at a plurality of locations along the chain of the polymer. Ligands that may be used to carry out the present invention include a ligand that is attached to the polymer backbone and is pendant to the backbone. Examples of ligands are set forth in co-pending application Ser. No. 09/185,891 filed Nov. 4, 1998, the disclosure of which is incorporated herein by reference in its entirety. Examples of such ligands include β-diketone, phosphate, phosphite, salen, bis imine, pyridine-bisimine, imidazole, pyrazolyl borate, pyridine, bi- and tripyridine, porphyrin, phthalocyanine, cyclopentadienyl, phosphonate, phosphinic acid, phosphine (e.g., alkyl, aryl, mono, bis, tris, and the like), thiophosphinic acid, dithiocarbamate, amino, ammonium, hydroxyoxime, hydroxamic acid, calix(4)arene, macrocyclic, crown ether, 8-hydroxyquinoline, picolylamine, thiol, and carboxylic acid ligands. Multiple types of ligands may be incorporated onto the same polymer backbone. Chiral ligands may also be employed.

Monodentate or polydentate ligands can be used if desired. O-donating chelating agents such as cupferron, chloroanillic acid and related agents, β-diketones, N-benzoyl-N-phenylhydroxylamine agents, macrocyclic compounds, etc; N-donating agents such as α-dioximines, diaminobenzidine and related reagents, porphyrines and related agents, etc; O,N-donating agents such as 8-hydroxyquinoline, nitrosonaphthols and nitrosophenols, ethylenediaminetetraacetic acid (EDTA) and other complex ionates, diphenylcarbazide and diphenylcarbazone, azoazoxy BN, etc.; S-donating chelating agents such as sodium diethyldithiocarbamate and related agents, dithiazone and related agents, bismuthiol II, thiothenoyltrifluoracetone, thioxine, etc.; and P-donating chelating agents such as tributylphosphate and related agents, etc.

The ligands may be attached (e.g., covalently bound) to the polymers using various techniques. Examples of suitable techniques include, but are not limited to, copolymerization of a monomer containing a ligand with a CO$_2$-philic monomer, derivatization of a homopolymer, derivatization of a copolymer, or other variations thereof that will be apparent to those skilled in the art based on the disclosure provided herein. As an example, methods for the attachment of phosphine groups to alkyl halide functionalized polymers and monomers are described (see Hodge and Sherrington (ed) *"Polymer Supported Reactions in Organic Synthesis*, John Wiley and Sons, (1980)). Additionally, diphenylphosphino alkylamines may react with N-hydroxy-succinimide esters to yield phosphine-functionalized polymers with the diphenylphosphino alkyl group linked through an amide bond (Bergbreiter et al, *J. Am. Chem. Soc.* 1998, 120, 4250–4251.

An embodiment describing the procedure for attaching a catalyst to a ligand is as follows. A ligand functionalized random copolymer is combined with a metal catalyst (most preferably a transition metal catalyst) in a suitable high pressure vessel and exposed to dense phase carbon dioxide along with the substrates necessary for the specific catalytic process. Alternatively, the polymer and catalyst may be combined in carbon dioxide or some other solvent prior to exposure to catalytic conditions. The resulting polymer-supported catalyst may be isolated as a solid or used directly in solution as required.

In one preferred embodiment, each polymer molecule has at least 10 to 20 catalyst sites bound thereto. These sites may be covalently bound to the polymer backbone by virtue of the ligands described above. There is typically no critical upper limit on the number of ligands bound to each polymer molecule, but the number may be (for example) up to 1,000 or 2,000, or even 5,000 or more.

Additionally, the composition may further comprise at least one reactant capable of interacting with the catalyst on the polymer. Examples of reactants include, but are not limited to, an olefin, hydrogen, carbon monoxide, an oxidant, oxygen, an aryl halide, a tin reagent, or silylating reagents such as R$_3$SiH wherein R$_3$ is selected from an alkyl group, a phenyl group, or a cyanide-containing group. The reactant may be present in various amounts. Preferably, the reactant is present in an amount ranging from about 0.000001 to about 3 mol percent based on the amount of catalyst. The reactant may soluble or insoluble in the reaction fluids set forth herein.

In accordance with the invention, the composition further may comprise a reaction product formed as a result of at least one reactant interacting with the catalyst on the polymer.

Various types of reactions may be encompassed by the methods of the invention. For example, examples of classes of reactions include, but are not limited to, hydrogenation, hydroformylation, epoxidation, and carbon-carbon coupling reactions (Stille and Heck type reactions). Epoxides are formed as a result of the epoxidation reactions. Hydrogenabon reactions typically result in olefins being reacted to form alkyls. Hydroformylation reactions usually result in the olefins being reacted to form aldehydes. Carbon-carbon coupling reactions typically provides products resulting from the formation of a new carbon-carbon double bond.

The method may also include other steps if desired. For example, in one embodiment, the method further comprises the step of separating the catalyst and polymer from the carbon dioxide, and reaction product by techniques known in the art, e.g., venting. The catalyst may then be reused if so desired by the end user.

The swellable polymers, for example swellable beads, that has catalyst bound thereto, may be separated from the reaction products and unreacted starting materials via techniques that are known. One such technique is illustrated in U.S. Pat. No. 5,242,877 to Dobson et al., the disclosure of which is incorporated herein by reference in its entirety.

The soluble polymers having catalyst bound thereto can be separated from the reaction products, unreacted material, and carbon dioxide using various techniques. For example, temperature and/or pressure conditions can be manipulated to assist in such separation. To illustrate further, polymer with catalyst bound thereto is soluble in carbon dioxide at a given temperature and pressure. When the products are to be separated from the bulk reaction medium, the temperature and/or pressure are adjusted such that the polymer with bound catalyst precipitates. The reaction products are typically soluble in carbon dioxide and a separation process set forth herein may be employed to isolate the carbon dioxide, reaction products, unreacted starting material, and polymer.

A general procedure for carrying out the invention is as follows. The preparation of the polymer may take place according to the embodiment described below. A fluoromonomer is randomly copolymerized with a functionalized monomer. As an example, at 65° C. in a fluorinated solvent (ααα-trifluorotoluene (TFT)) or carbon dioxide, a fluorinated acrylate or methacrylate monomer such as Zonyl TA-N (DuPont) is randomly copolymerized with a functionalized monomer using a radical initiator such as 2,2'-azobisisobutyronitnle (AIBN). The comonomer is preferably an acrylate, methacrylate, or styrenic monomer, however other comonomers may be employed. Examples of comonomers include, but are not limited to, vinyl benzyl acetylacetone (VBA), 2-methacryloyloxyethylacetoacetate, N-acryloxy-succinimide, 2-bromoethylacrylate (BEA), vinylbenzyl chloride (VBC), glycidyl methacrylate (GMA), N,N'-dimethylaminoethyl methacrylate (DMAEMA), vinyl pyridine, 1-vinyl imidazole, acryloyl chloride, vinyl benzaldehyde, and vinyl benzylalcohol. Mixtures of the above may be employed. After a sufficient reaction time (e.g., 20 hours), the polymer is typically isolated by precipitation (pouring fluorinated solvent solution into methanol or venting carbon dioxide).

In another aspect, the invention relates to a method of separating at least one component from a fluid mixture. The method comprises contacting a swellable polymer with a fluid mixture. The fluid mixture comprises at least one component and carbon dioxide. The carbon dioxide penetrates or plasticizes into the polymer such that component is separated from the carbon dioxide.

A number of components may be separated from the carbon dioxide. Examples include, but are not limited to, organics (e.g., methane and other light hydrocarbons typically encountered in oil and fuel applications, e.g., $C_1$ to $C_8$ hydrocarbons, more preferably $C_1$ to $C_4$), volatile organic contaminants (VOCs); monomers; initiators; chlorofluorocarbons; mercaptans; and other contaminants. Other components that may be separated from carbon dioxide include, but are not limited to, water, nitrogen, helium and other noble gases, and hydrogen. The components may be present in two-component or multi-component mixtures. Preferably, the method of the invention allows for at least 10 percent enhancement of concentration.

The method of separation may take place in various configurations known to one skilled in the art. Typically, the swellable polymer is employed as beads in a packed column. In other embodiments, the swellable polymer may be used as a thin film, a membrane, or as a composite membrane, such as in a hollow fiber separating device.

Depending on the application, the polymers that are insoluble in carbon dioxide may be considered swellable (i.e., relatively non-porous) or more highly porous. The more highly swellable polymers are particularly well suited for separation methods of the invention, while the more highly porous polymers are well suited for catalysis methods. A more highly swellable polymer preferably has a porosity ranging from about 0.1 to about 1 $m^2/g$ as determined by $N_2$-BET (more preferably from about 0.2 to 0.4 $m^2/g$) and a more highly porous polymer has a preferred porosity ranging from about 100 to about 300 $m^2/g$ as determined by $N_2$-BET (more preferably from about 150 to about 250 m2/g).

Depending on the level of porosity desired, one may include various amounts of monomer used in forming a $CO_2$-philic segment, crosslinker, and/or monomer used in forming a $CO_2$-phobic segment. With respect to the more highly swellable polymers, these polymers preferably comprise from about or above 0 to about 80 weight percent of monomer used in forming a $CO_2$-philic segment (more preferably from about 20 to about 80 weight percent), from about 3 to about 25 weight percent of crosslinker, and from about 2 to about 90 percent by weight of monomer used in forming a $CO_2$-phobic segment.

With respect to the more highly porous polymers, these polymers preferably comprise from about or above 0 to about 45 weight percent of monomer used in forming a $CO_2$-philic segment, from about 55 to about 95 fei weight percent of crosslinker, and from about or above 0 to about 20 percent by weight of monomer used in forming a $CO_2$-phobic segment. Additionally, in forming the more highly porous polymers, one may use any number of processing aids to help increase porosity, the selection of which is known to those skilled in the art. For example, a non-polymerizable component that is soluble in a monomer-phase but not in an aqueous phase can be used (e.g., porogen in an amount 50 v/v percent). Examples include, without limitation, small molecule organics such as toluene, N,N-dimethyl formamide (DMF), and the like.

The following examples are intended to illustrate the invention and do not limit the scope of the invention.

Example 1

Copolymer Synthesis

Zonyl® TAN monomer (DuPont) (10 g) and 10 mol % N-acryloxysuccimide monomer (NASI) (Polysciences, Inc) are polymerized under a nitrogen atmosphere in ααα-trifluorotoluene at 65° C. for 20 hours using AIBN as the initiator. The resulting solution is transferred via cannula into methanol to precipitate the polymer as a white solid which is isolated by filtration and dried in vacuo (7.83 g, 76% yield).

Example 2

Polymer Derivatization 1 g of the 10 mol % NASI/zonyl TAN polymer is dissolved in 10 mL of Freon-113 (1,1,2-trichloro-trifluoroethane). 3-diphenylphosphino propylamine is added (0.060 g) and the reaction is stirred under $N_2$ at room temperature for several hours. A white insoluble precipitate is observed on the surface of the reaction solution. The solution is filtered to remove the white precipitate before pouring methanol to precipitate the polymer. The white solid is filtered and dried (0.74 g). Characterization by $^{31}p$ NMR reveals 2 minor peaks around 34 ppm and 29 ppm (phosphine oxides) and a major peak at −17 ppm (phosphine).

Example 3

Catalytic Hydrogenation of Olefins

A high pressure vessel is charged with diphenylphosphino-functionalized polymer and a catalytic amount of rhodium complex such as chloro(1,5-cyclooctadiene)rhodium (I) dimer or chlorobis(ethylene) rhodium (I) dimer. An olefinic substrate is added and the vessel is pressurized with hydrogen gas (200 psig) and carbon dioxide (3000 psi). The vessel is warmed to the appropriate reaction temperature and resulting total pressure. After a sufficient reaction time, the high pressure cell is vented and the organic substrate is isolated and analyzed.

Exampnles 4–9

Swellable Crosslinked Polymers

Materials used in Examples 4–9 include gelatin, sodium dodecyl benzene sulfonate, poly(diallylammonium chloride), and boric acid that were purchased from Aldrich, Inc. Zonyl® FS-62 and Vertrel (1,1,1,2,3,4,4,4,5,5,5-decafluoropentane), fluorosurfactant, and fluorosolvent respectively, were purchased from DuPont of Wilmington, Deleware. Sodium nitrile was purchased from Baker Chemical Co. of Phillipsburg, New Jersey. Sodium hydroxide, methanol, and tetrahydrofuran were purchased from Mallinkrodt Chemical of St. Louis, Mo. All the above were used as received. Divinylbenzene (DVB), ethylene glycol dimethacrylate, used as crosslinkers, as well as styrene, were purchased from Aldrich of St. Louis, Mo. and deinhibited prior polymerization by passing them through an alumina adsorption column. FOMA (1,1-dihydroperfluorooctyl methyacrylate) was purchased from 3M along with the other monomers deinhibited prior to polymerization. The initiator, 2,2-azobutyronitrile (AIBN), was purchased from Wako Pure Chemical Industries, Ltd. of Osaka, Japan and purified by crystallization from methanol prior to utilization.

A baffled-round bottomed flask and a 30 mm TFE starburst-stirring head were used to achieve suspension polymerization by magnetic stirring. Regarding suspension by mechanical stirring, a baffled-cylindrical reaction vessel with a somewhat flattened base and a propeller-type impeller with a pitch of approximately 45° are used in order to optimize the flow pattern. In both stirring procedures, the fluid is forced initially towards the base of the reactor giving a vertical flow pattern. The impeller is connected to a laboratory overhead stirrer controlled by a mixer controller (Servodyne manufactured by Cole-Parmer Instrument Co. of Vernon Hills, Ill.). In these instances, a hot plate (i.e., Mirak™), fitted with an oil bath, is employed in control stirring speed and temperature.

Examples 4–5 illustrate the synthesis of crosslinked fluoropolymers by suspension polymerization carried out in an aqueous continuous phase in which the monomer phase is suspended in the form of droplets by virtue of a stirrer and suspension agents. Although not wishing to be bound by any one theory, the polymerization is believed to take place within the monomer droplets yielding polymer beads. Controlled agitation and presence of stabilizers are believed to be two potentially significant factors in the success of this heterogeneous polymerization. Optimized conditions are potentially capable of yielding uniform polymer beads with a narrow size distribution as well as potentially minimize the tendency for particle coalescence.

The syntheses of styrene/divinylbenzene/FOMA and styrene/EGDMA/FOMA systems has been typically performed with 10 mol percent of crosslinking and from 0 mol percent to 50 mol percent of fluorinated monomer. All syntheses are carried out employing either a magnetic stirrer at variable stirring speeds (300 rpm to 800 rpm) or a mechanical stirrer (180 rpm as the highest speed).

Example 4

Continuous Phase Preparation

In 20 ml of deionized water, 0.0043 g of sodium dodecylbenzene sulfonate, 1.28 g of poly(diallylammonium chloride), 1 g of Zonyl® FS-62 and 0.0266 g of boric acid are dissolved in the above order at room temperature directly into the reactor. The pH of the aqueous solution is adjusted to 10.0 by adding droplets of a 25 percent aqueous sodium hydroxide solution. Finally, 0.005 g of sodium nitrile are poured into the reactor. Separately, in a 10 ml beaker, a gelatin solution is prepared with 3 ml of deionized water and 0.141 g of gelatin. This solution is subsequently heated to 50° C. and added, still hot, to the aqueous continuous phase. The stirring mode is adapted to the reaction vessel, which is capped with septa, sealed, placed into an oil bath, and heated to 45° C. The mixture is flushed with nitrogen for 45 minutes. The stirring speed is set up at variable speed (from 180 rpm to 800 rpm), depending on the stirring mode (magnetic or mechanical).

Example 5

Dispersed Phase Preparation

Styrene, divinylbenzene, and FOMA are added along with AIBN in a round-bottomed flask that is capped with septa and sealed. The monomer mixture is flushed for 20 min with nitrogen prior to canulation into the reaction vessel containing the aqueous continuous phase. When the oil bath temperature reaches 65° C., the dispersed phase is canulated into the main reactor. A slight positive nitrogen pressure is maintained throughout the polymerization. After 24 hours, the reaction mixture is cooled and flushed. The filtered copolymer is washed with water, methanol, tetrahydrofuran, and Vertrel until the washed solution does not turn cloudy upon addition to water. Washed copolymer beads are dried and separated into fractions with a mesh US standard sieves (38, 45, 75, 125, 250 and 500 μm) using a sieve shaker.

Example 6

Crosslinked Swellable Polymer Synthesis

Crosslinked swellable polymers were prepared by a suspension polymerization using an apparatus described in Hodge, P., Sherrington D.C., *Polymer-supported reactions in organic synthesis* 1981, Wiley, London, Appendix and Arshady R., *Colloid Polym. Sci.* 1992, 270:717. In a first step, an aqueous continuous phase was prepared. Stabilizers and fluorostabilizers were charged into a baffled round-bottomed reactor containing deionized water. Separately, a gelatin solution was prepared, heated to 50° C., and added, still hot, to the aqueous phase. Then, the reactor was placed into an oil bath regulated at 45° C. At the same time, a uniform stirring was established using a variable speed (from 180 rpm to 500 rpm) stirrer. Finally, the mixture was flushed with nitrogen for 45 min. During the period, the dispersed phase was prepared. Styrene, crosslinker, and FOMA were added to the round-bottomed flask as well as the water-insoluble initiator. The monomer mixture was flushed for 20 min. with nitrogen prior to cannulation into the reaction vessel containing the aqueous suspending phase. Then, the oil bath temperature was raised up to 65° C. to 70° C. A slight positive nitrogen pressure was maintained throughout the polymerization. The reaction was allowed to proceed for 24 h, and then cooled to room temperature, filtered, and washed with water, methanol, tetrahydrofuran, and Vertrel until the washed solution did not turn cloudy upon addition to water. The copolymer. beads were dried under vacuum and separated into fractions with US standard sieves (38, 45, 75, 125, 250, 500 μm) using a sieve shaker.

Example 7

Incorporation of Catalyst into the Crosslinked Swellable Polymer

The procedure set forth in Example 6 was employed to incorporate rhodium into the crosslinked beads. Either sty-phos or acrylophos was added to the monomer phase. The catalyst monomer was made by ligand exchange. To obtain porous polymer particles, porogen is added to the monomer phase prior to polymerization and extracted after recovery of the polymer beads. The pore size distributions and surface areas of the polymer beads were determined from $N_2$-BET isotherms.

Example 8

Effect of FOMA Content on Swellable Polymer

Figure 1:
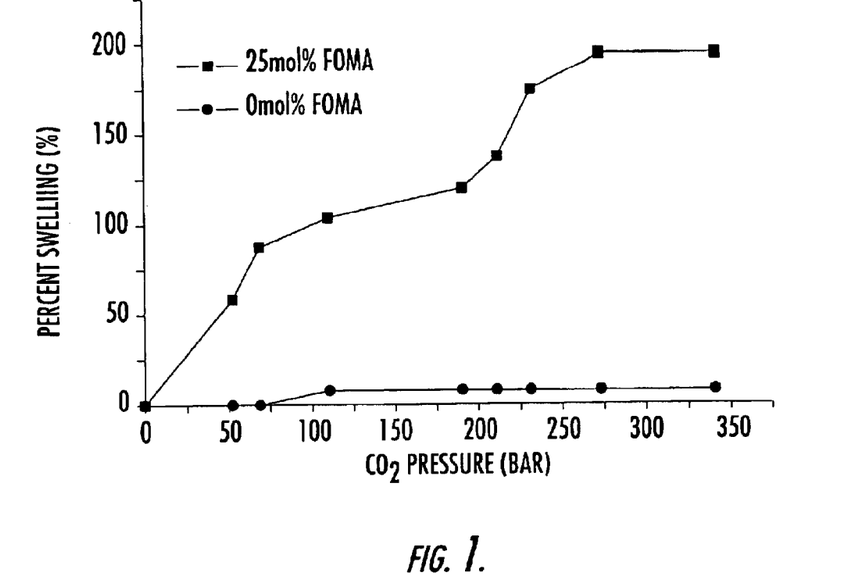
FIG. 1 illustrates the effect of 1,1'-dihydroperfluorooctyl methacrylate ("FOMA") in a polymer on the percent swelling of the polymer.

The effect of incorporating FOMA into a polymer on percent swelling was measured for various carbon dioxide pressures. This swelling behavior was compared to a polymer that did not employ FOMA. As seen in FIG. 1, a polymer containing 25 mol percent FOMA exhibited superior swelling behavior to a polymer that did not employ FOMA.

Example 9

Effect of FOMA Content on Swellable Polymer

Figure 2:
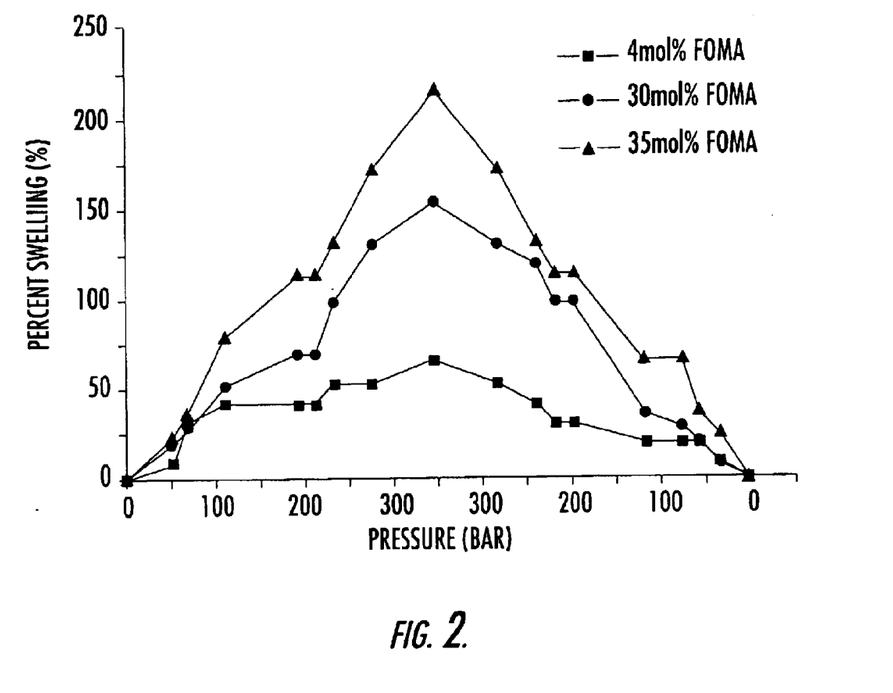
FIG. 2 illustrates the effect of FOMA in a polymer on the percent swelling of the polymer.

The effect of incorporating various levels of FOMA into a polymer on percent swelling was measured for different carbon dioxide pressures. Swelling behavior was determined for polymers with 4, 30, and 35 percent by weight of FOMA. As seen in FIG. 2, the polymer containing 35 mol percent FOMA in general exhibited superior swelling behavior to the other polymers.

Example 10

Effect of Pressure and FOMA Content on Swellable Polymer

The effect of carbon dioxide pressure and FOMA content on percent polymer swelling was measured as a function of time. Divinyl benzene was employed as the crosslinker. The pressures that were investigated were 103 bar, 172 bar, and 276 bar. Polymers having FOMA contents of 0, 10, 30, and 35 mol percent were investigated.

Figure 3:
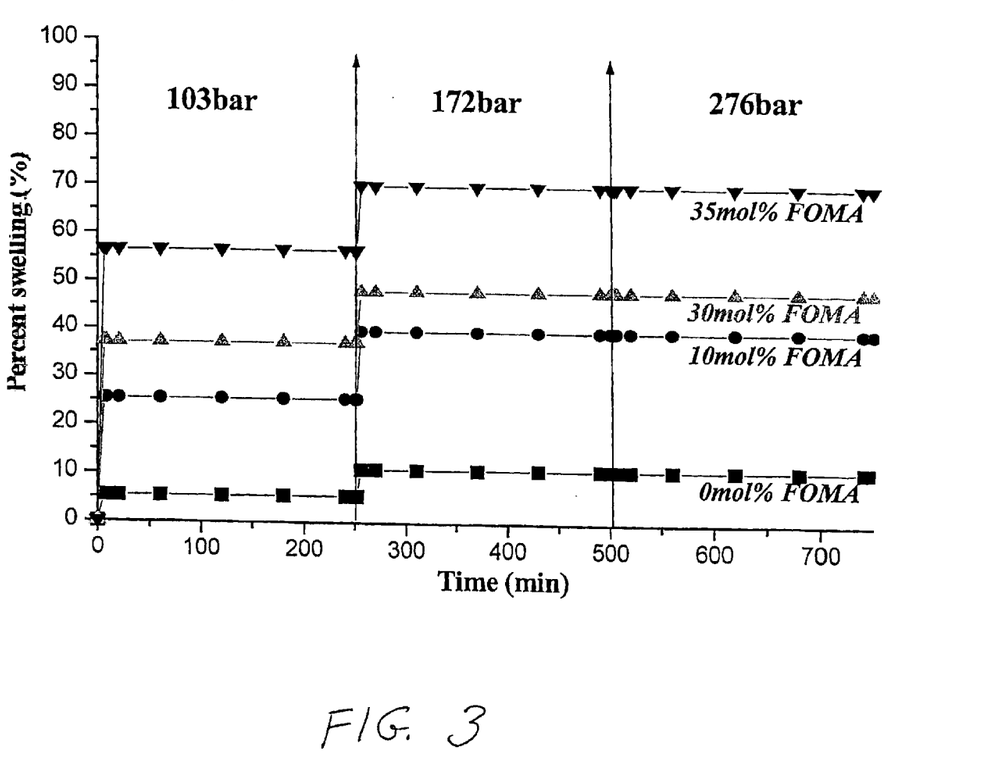
FIG. 3 illustrates the effect of carbon dioxide pressure and FOMA content on percent polymer swelling using divinyl benzene as the crosslinker.

FIG. 3 illustrates the results of the study. As illustrated, the percent swelling generally increased as a function of pressure and FOMA content.

Example 11

Effect of Pressure and FOMA Content on Swellable Polymer

Figure 4:
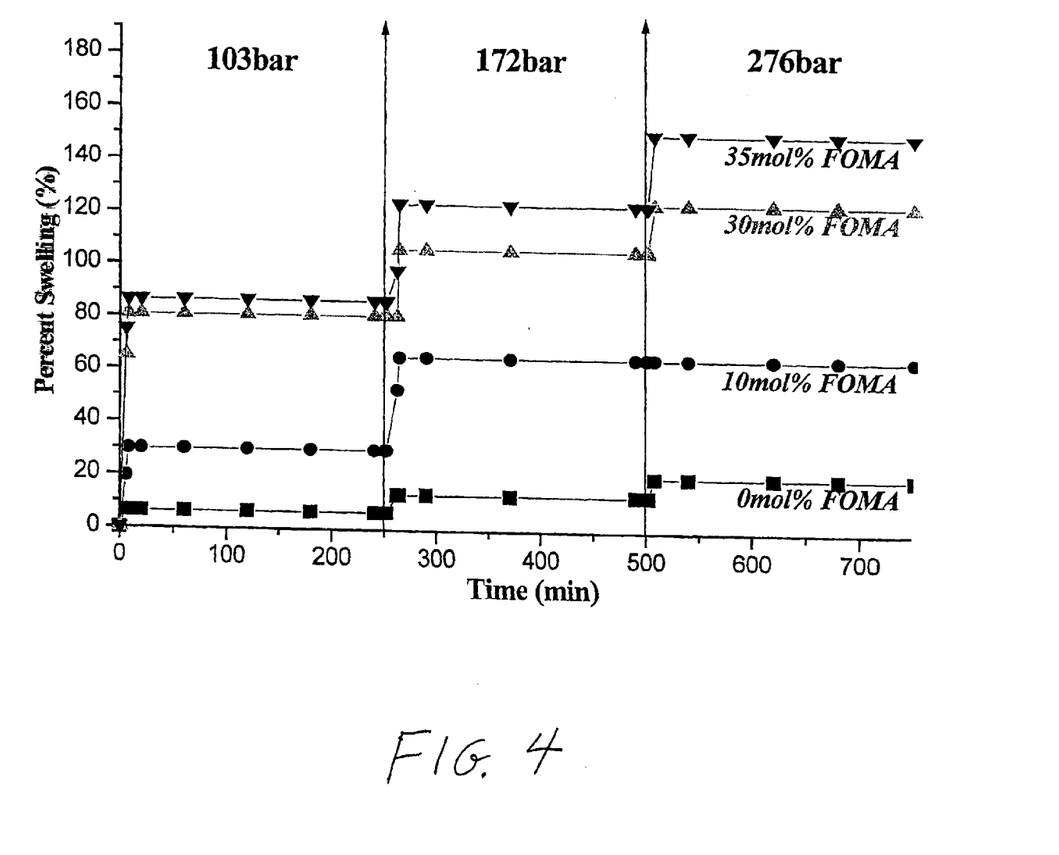
FIG. 4 illustrates the effect of carbon dioxide pressure and FOMA content on percent polymer swelling using ethylene glycol dimethacrylate as the crosslinker.
Figure 5A:
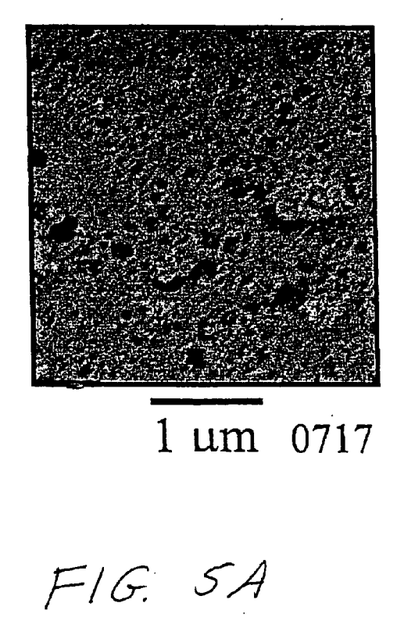
FIGS. 5A and 5B are SEM photographs of swellable polymers produced in accordance with the invention.
Figure 5B:
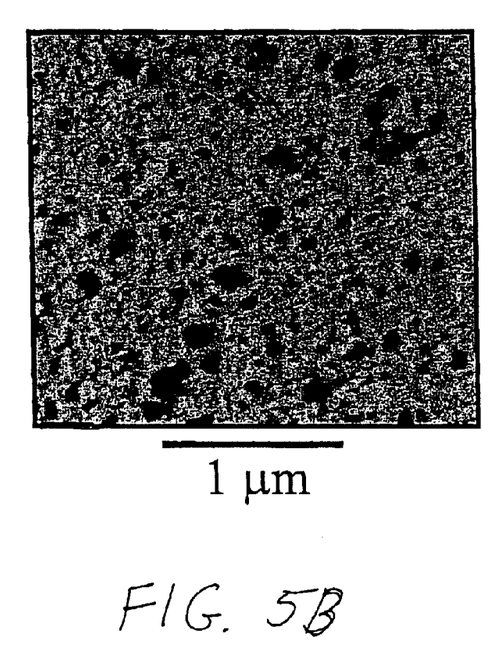
Figure 6A:
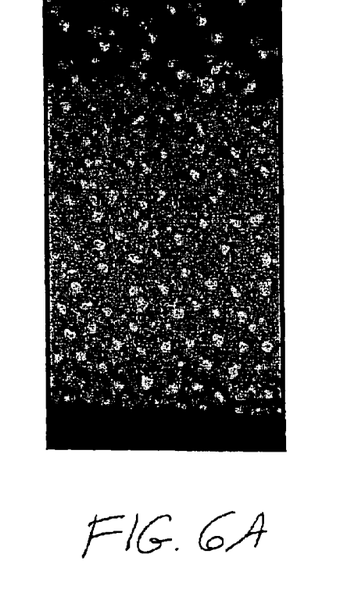
FIGS. 6A and 6B are SEM photographs comparing a swellable crosslinked fluoropolymer beads (FIG. 6A) with porous fluoropolymer beads (FIG. 6B). The fluoropolymer of FIG. 6A comprises 34 weight percent of styrene, 60 weight percent of FOMA, and 6 weight percent of crosslinker. The polymer has a porosity of 0.3 $m^2/g$ measured by $N_2$-BET. The fluoropolymer of FIG. 6B comprises 5 weight percent of styrene, 15 weight percent of FOMA, and 80 percent of crosslinker. The polymer has a porosity of 230 m$^2$/g measured by N2-BET.
Figure 6B:
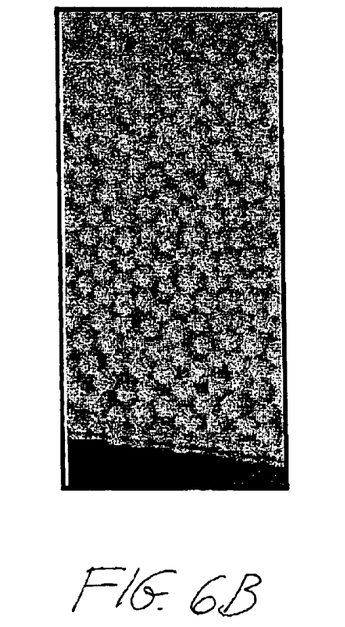

Example 10 was repeated except that ethylene glycol dimethacrylate was employed as the crosslinker. FIG. 4 shows the results of the study. In general, polymers having higher FOMA levels displayed increased swelling relative to comparable polymers depicted in Example 10.

The invention has been described in reference to the preferred examples and embodiments set forth above. It should be appreciated however that these examples and embodiments are merely intended to illustrate the invention and not limit its scope.

That which is claimed:

1. A method for carrying out a catalysis reaction in carbon dioxide, said method comprising:

contacting a fluid mixture with a catalyst bound to a polymer, the fluid mixture comprising at least one reactant and carbon dioxide, wherein the reactant interacts with the catalyst to form a reaction product, and wherein the polymer is soluble in carbon dioxide.

2. The method according to claim 1, wherein the carbon dioxide is gaseous carbon dioxide.

3. The method according to claim 1, wherein the carbon dioxide is liquid carbon dioxide.

4. The method according to claim 1, wherein the carbon dioxide is supercritical carbon dioxide.

5. The method according to claim 1, wherein said contacting step comprises a reaction taking place selected from the group consisting of a hydrogenation reaction, a hydroformylation reaction, a epoxidation reaction, and a carbon-carbon coupling reaction.

6. The method according to claim 1, wherein the catalyst comprises a transition metal.

7. The method according to claim 6, wherein the transition metal is selected from the group consisting of ruthenium, rhodium, palladium, platinum, vanadium, molybdenum, and a fluorous-soluble material.

8. The method according to claim 1, wherein the catalyst is an enzymatic catalyst.

9. The method according to claim 8, wherein the enzymatic catalyst is selected from the group consisting of alcohol dehydrogenases, alcohol oxidase, aldolase, phosphatases, alphahyinotrypsin, asparaginase, anhydrase, catalase, creatine kinase, glutarninase, oxidases, lipases, luciferase, urease, hydratase, peroxidase, subtilisin Carlsberg and BPN', thermolysin, superoxidase, nitrilearnidase, esterases, trnsanase, trypsin, flunarase, amidase, acylase, peptidases, carboxylases, RNAses, glycolases, transeferases, enzymes, and mixtures thereof.

10. The method according to claim 1, wherein the polymer comprises at least one carbon dioxide-philic group.

11. The method according to claim 10, wherein the carbon dioxide-philic group comprises a group selected from a silicone-containing group and a fluorine-containing group.

12. The method according to claim 10, wherein the carbon dioxide-philic group comprises a fluoropolymer derived from acrylate or methacrylate monomers.

13. The method of claim 10, wherein the carbon-dioxide philic group comprises a fluoropolymer.

14. The method according to claim 1, wherein the catalyst is bound to a ligand which is bound to the polymer at a plurality of locations along the chain of the polymer.

15. The method according to claim 14, wherein the ligand is selected from the group consisting of β-diketone, phosphate, phosphite, salen, bis inine, pyridine-bisimine, imidazole, pyrazolyl borate, pyridine, bi- and tripyridine, porphyrin, phthalocyanine, cyclopentadienyl, phosphonate, phosphinic acid, phosphine, thiophosphinic acid, dithiocarbarnate, amino, ammonium, hydroxyoxine, hydroxamic acid, calix(4)arene, macrocyclic , crown ether, 8-hydroxyquinoline, picolylamine, thiol, carboxylic acid ligands, chiral ligands, monodentate ligands, polydentate ligands, and mixtures thereof.

16. The method according to claim 1, wherein the at least one reactant is selected from the group consisting of an olefin, hydrogen, carbon monoxide, an oxidant, oxygen, an aryl halide, a tin reagent, and a silylating reagent.

* * * * *

UNITED STATES PATENT AND TRADEMARK OFFICE
CERTIFICATE OF CORRECTION

PATENT NO. : 6,747,179 B1
DATED : June 8, 2004
INVENTOR(S) : DeSimone et al.

It is certified that error appears in the above-identified patent and that said Letters Patent is hereby corrected as shown below:

Column 10,
Line 58, should read -- $CO_2$-philic segment, from about 55 to about 95 weight --

Column 11,
Line 30, should read -- is filtered and dried (0.74 g). Characterization by $^{31}P$ NMR --

Column 15,
Lines 12-16, should read -- phosphatases, alpha-chymotrypsin, asparaginase, anhydrase, catalase, creatine kinase, glutaminase, oxidases, lipases, luciferase, urease, hydratase, peroxidase, subtilisin Carlsberg and BPN', thermolysin, superoxidase, nitrileamidase, esterases, transaminase, trypsin, fumarase, amidase, acylase, --

Column 16,
Lines 10-14, should read -- phosphate, phosphite, salen, bis imine, pyridine-bisimine, imidazole, pyrazolyl borate, pyridine, bi- and tripyridine, porphyrin, phthalocyanine, cyclopentadienyl, phosphonate, phosphinic acid, phosphine, thiophosphinic acid, dithiocarbamate, amino, ammonium, hydroxyoxime, --

Signed and Sealed this

First Day of February, 2005

JON W. DUDAS
*Director of the United States Patent and Trademark Office*